(No Model.)
C. A. SMITH.
SCOOP OR SHOVEL FOR EXCAVATING MACHINES.
No. 545,025. Patented Aug. 20, 1895.
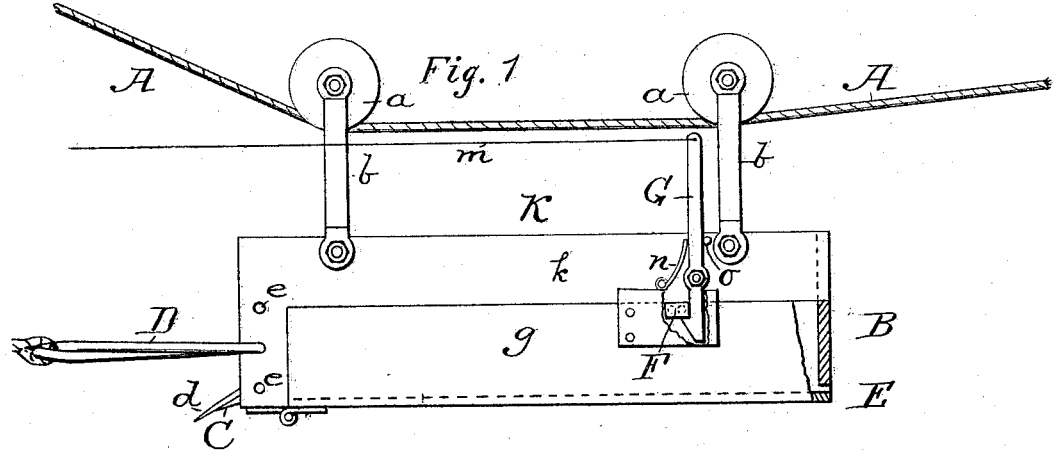
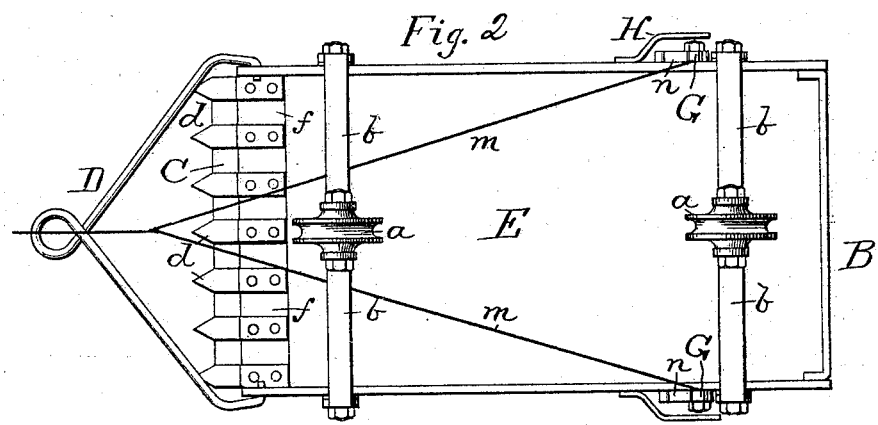
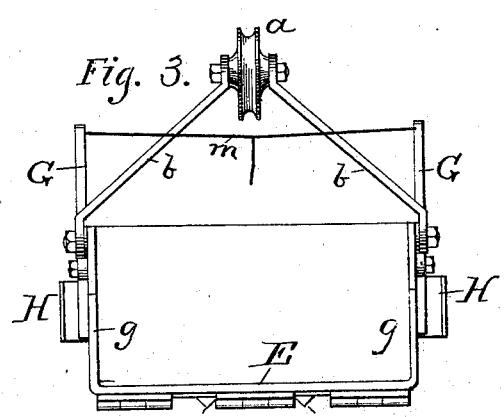
Witnesses.
Theo. B. Heller.
Hoyt King.
Inventor.
Charles A. Smith,
By
Frank W. Thomason.
Attorney.

UNITED STATES PATENT OFFICE.

CHARLES A. SMITH, OF CHICAGO, ILLINOIS.

SCOOP OR SHOVEL FOR EXCAVATING-MACHINES.

SPECIFICATION forming part of Letters Patent No. 545,025, dated August 20, 1895.

Application filed July 30, 1894. Serial No. 519,002. (No model.)

*To all whom it may concern:*

Be it known that I, CHARLES A. SMITH, a citizen of the United States, and a resident of Chicago, in the county of Cook and State of Illinois, have invented certain new and useful Improvements in Scoops or Shovels for Excavating-Machines, of which the following is a full, clear, and exact description, reference being had to the accompanying drawings, and to the letters of reference marked thereon.

The object of my invention is to provide a scoop or shovel which is so constructed that the depth it digs into the soil during its cutting movement can be easily and perfectly regulated in a very simple manner, and the unloading of which is so accomplished that by lowering the scoop after its discharge it will close automatically when it comes in contact with the ground, substantially as hereinafter fully described, and as illustrated in the drawings, in which—

Figure 1 is a side elevation of my invention. Fig. 2 is a plan view of the same, and Fig. 3 is a rear elevation thereof.

In the drawings, A represents a lifting-rope, from which my improved scoop or shovel K is suspended. This suspension is accomplished by means of two grooved travelers $a$ $a$, located over the front and rear portions of the scoop, respectively, and journaled to and between the upper ends of the hangers $b$ $b$, to the lower ends of which latter the scoop is preferably pivotally connected, as shown. This scoop K is preferably of a rectangular box-shape construction, having its rear end closed by a tail-piece B, the lower edge of which does not quite reach the bottom of the scoop. The forward end of the scoop is open and the forward edge of the bottom is provided with a cutting plate or share C, which projects forward beyond the front edge of the vertical sides of the scoop and downward at a suitable angle from the horizontal plane of the bottom. The front edge of this plate C is suitably sharpened, and, if desired, it can be provided with a series of sharpened prongs or points $d$, as shown, to assist it in digging into the soil when the scoop is drawn forward over the ground. The front edge of the sides of the scoop proper is also provided with a series of openings $e$ therein, within which the ends of the clevis D can be secured, as desired. This clevis has secured thereto the draft-rope, which is used to draw the scoop directly forward.

Only a short stretch $f$ of the bottom of the scoop at the forward end thereof is permanently secured to the sides of the same, and this stretch $f$ is preferably of a length just sufficient to support and secure the cutting-plate C in place. The remainder of the bottom E is hinged, as shown, to the forward part $f$, and is adapted to drop downward when desired to discharge the load accumulated therein.

I prefer to secure to the hinged part of the bottom E the sides $g$, which, when the scoop is closed, form part of the sides thereof, about as shown. To these sides, near the rear end of the scoop, I provide the lugs F, which are engaged by the lower hooked ends of the trip-dogs G. These trip-dogs G are pivoted to the sides $k$ of the scoop K proper, and have their upper arms extend above the plane of the scoop, where cords or ropes $m$ are secured thereto, which extend forward therefrom to pull said dogs out of engagement with the lugs F and thus permit the hinged bottom of the scoop to drop of its own weight. In order to restore said dogs to their normal positions when the cord $m$ is released, I provide springs $n$, which are secured to the sides $k$ of the scoop in front of and pressing back against the upper arms of the dogs. Thus, when released, the dogs are returned to their normal positions and move backward until the stop-pins $o$ prevent further movement, as shown.

The end of the dogs extending below the lugs F, when the scoop is closed, is beveled, so that it can be pushed back to allow the passage of said lugs when the bottom is being closed.

Now, in operation when the clevis is secured to the scoop K at about the point shown in Fig. 1 a medium cut is made into the soil. If secured above this point a deeper cut will result, and if below this point a shallower cut. In the ordinary operation of my invention, however, time cannot be spared to stop and adjust the clevis every time it is considered necessary to regulate the depth of the cutting of the scoop, and it is therefore necessary to adopt a more expeditious method. This I accomplish by means of the lifting-rope. For example, while the scoop is being drawn forward I lift the forward end of rope A, thus raising the forward end of the scoop and decreasing the depth of the cut made thereby, or I slack the lifting-rope and allow the cutting to dig more deeply into the soil.

In order to prevent the rubbing of the sides of the scoop against the sides of the cutting made thereby and causing the dogs to accidentally unlock, I have provided the guard-plates H, which, as shown, are secured to the sides $g$ and protect the engagement of the dog with the lugs F. I much prefer the use of these guard-plates, but it will be understood that they are not absolutely necessary.

What I claim as new is—

1. A scoop K, the cutting-plate C therefor, clevis D, and travelers located over the forward and rear portions of said scoop, and hangers for suspending the same therefrom, and dogs G, in combination with the hinged bottom E provided with the sides $g$, and lugs F, as set forth.

2. A scoop K having its rear end closed and its forward end open, the cutting-plate C provided with prongs $d$ an adjustable clevis, two travelers located, respectively over the front and rear portions thereof, hangers for suspending said scoop therefrom, and dogs G, in combination with the hinged bottom E provided with the sides $g$, lugs F spring $n$ and stop-pins $o$ as set forth.

3. A scoop K having its rear end closed and its forward end open, the cutting-plate secured to and projecting at a downward angle from the forward edge of the bottom, two travelers located, respectively, over the front and rear portions thereof, hangers for suspending the scoop therefrom, and dogs G pivoted to the sides of said scoop near the rear end thereof, in combination with the hinged part of the bottom E having sides $g$, lugs F located with reference to and engaged by said dogs suitable springs for restoring said dogs to their normal positions and guard-plates H, as set forth.

CHARLES A. SMITH.

Witnesses:
FRANK D. THOMASON,
THEODORE B. HELLER.